United States Patent

[11] 3,596,530

| [72] | Inventor | Kiyokazu Yoshigai<br>9-15 Wakaeminami-machi 1-chrome,<br>Higashiosaka-shi, Osaka-Ku, Japan |
|---|---|---|
| [21] | Appl. No. | 839,861 |
| [22] | Filed | July 8, 1969 |
| [45] | Patented | Aug. 3, 1971 |
| [32] | Priority | Aug. 10, 1968 |
| [33] | | Japan |
| [31] | | 43/68679 |

[54] BRAKE OPERATING DEVICE
3 Claims, 7 Drawing Figs.

[52] U.S. Cl. ........................................... 74/480 R, 74/489
[51] Int. Cl. .................................................. G05g 11/00
[50] Field of Search ............................................ 74/480, 488, 489

[56] References Cited
UNITED STATES PATENTS

| 3,176,536 | 4/1965 | Altenburger | 74/489 |
| 3,403,577 | 10/1968 | Ozaki | 74/480 |

*Primary Examiner*—Milton Kaufman
*Attorney*—Sughrue, Rothwell, Mion, Zinn and Macpeak ABSTRACT: A drop-type bicycle handle is provided with hand operating brake means having a conventional brake lever member pivoted to a bracket secured upon the handle. Said lever member has a stepped portion formed at a portion thereof which abuts against the bracket and an engaging member is pivotably secured to the lever member for releasable engagement with the stepped portion. Upon release of this engaging member from the stepped portion, the lever member is rotated further so as to further release the release wire.

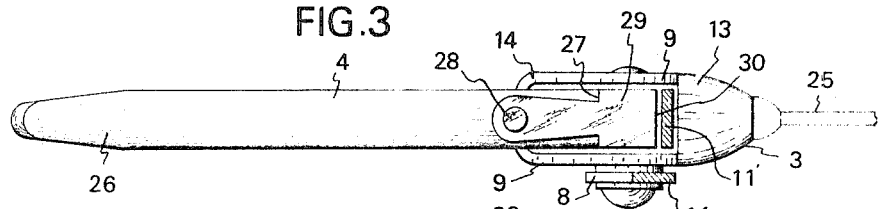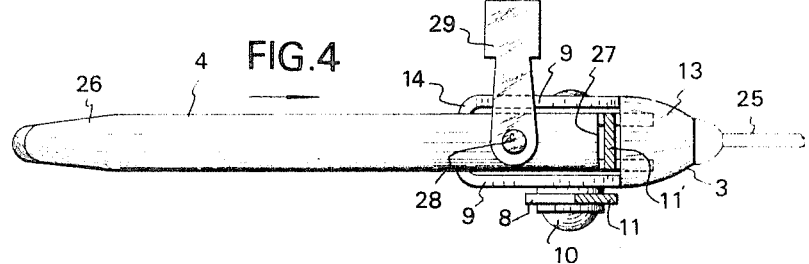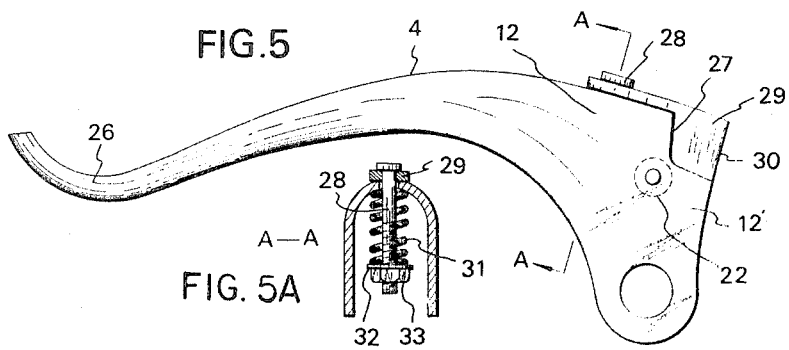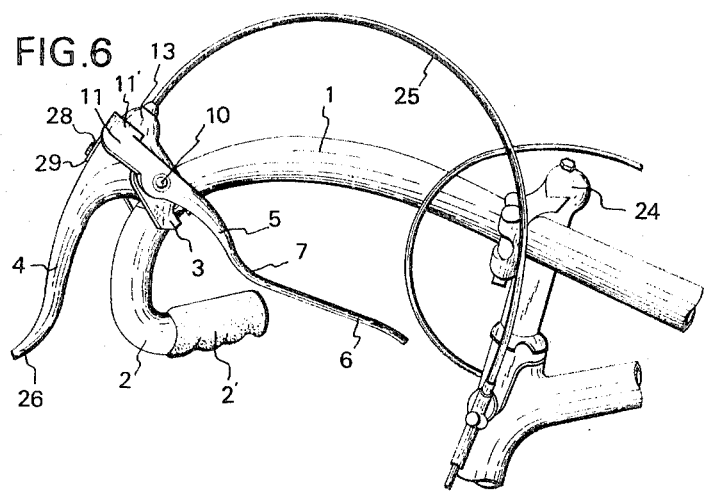

BRAKE OPERATING DEVICE

BACKGROUND OF THE INVENTION

The present invention relates to a brake operating device fitted to the handle, and more particularly, to the drop-type handle of a bicycle wherein the brake lever for operating the brake shoe of the front or rear wheel can be always safely and securely operated from any optional gripping position of the drop handle and the brake shoe may be spaced apart from the rim of the wheel by a distance larger than the normal gap or space therebetween as needs demand by slacking or extending the brake shoe actuating wire connected to the brake lever.

The drop handle of this invention consists of a substantially horizontal straight rod section connected to the fork shaft of the front wheel while crossing said fork shaft at right angles, and the substantially U-shaped bent rod sections extending forwardly from both ends of said straight rod section. It is known that the drop handle is adapted to a racing bicycle for track or road race which requires high speed running, or to a cycling tour bicycle which is expected to run a long distance. Further, the drop handle, with it s highly efficient functional structure, can provide stable as well as effective running positions which gives minimum fatigue to the rider by allowing him to suitably select the gripping position in accordance with the running conditions or purposes, for example, running from a low speed to high speed or from a flat place to a slope.

The brake levers, as is well known, are attached at the substantially middle part, or slightly upwardly thereof, of the bent rod sections by means of fitting brackets. However, the rider will find it impossible to operate these levers at these positions simultaneously with both hands gripping the handle. Thus, the rider must sometimes run in an unsafe condition where he releases the grasp upon the handle to hold tightly the levers instead of operating them. Such unstable handling operation will impede smooth running of the bicycle and may invite swaying of the bicycle body or momentary interruption of steering, which may cause the bicycle to fall down, hit or collide with other vehicles or pedestrians.

In view of the above, the inventor has disclosed in U.S. Pat. No. 3,403,577 a brake operating device for a drop-type handle of a bicycle having an auxiliary brake lever drivingly interlocked with a main brake lever so that a rider may securely and safely apply the brake from any handle gripping position.

In the case of the brake of the character described, the brake lever is connected to a wire which actuates a center-pull or side-pull-type brake shoe which is pressed against the rim of a wheel when the brake lever is actuated. The distance between the brake shoe and the rim is very small and the brake shoes present some problems especially in case of a collapsible-type bicycle which is disassembled and reassembled frequently by removing the wheels. Therefore, generally one end of the brake shoe actuating wire must be disconnected so as to increase the distance between the brake shoe and the rim when the bicycle is disassembled. Therefore, it is very tedious to connect the wire again in assembly and, furthermore, skills and experiences are required for correct adjustment of the tension of the wire since it is always under tension.

Summary of the Invention

In view of the above, the primary object of the present invention is to provide an improved brake operating device for a drop-type handle bicycle wherein a brake lever for actuating a brake shoe through a release wire is pivotably secured to a bracket fitted securely in position over the bent rod section of a drop-type handle; a stepped portion is formed at a portion of the brake lever which abuts against the bracket; and an engaging member pivotably secured to the brake lever is releasably engaged with the stepped portion, whereby upon release of the engaging member, the release wire may be slacked, thereby facilitating the adjustment of the tension of the wire.

Another object of the present invention is to provide an improved brake operating device for a drop type handle bicycle wherein the smooth and safe brake lever actuation may be effected by a rider from any handle gripping position and the space between the brake shoe and the rim of the wheel can be increased as needs demand thereby facilitating the removal of the wheels from the bicycle body or frame.

The above and other features, objects and advantages of the present invention will become more apparent from the following description of one illustrative embodiment thereof with reference to the accompanying drawings.

BRIEF DESCRIPTION OF THE DRAWING

FIG. 3 is a plan view illustrating the essential parts of the brake lever thereof with an engaging member being in engagement with a stepped portion;

FIG. 4 is a view similar to FIG. 3, but illustrates the engaging member being released from the stepped portion;

FIG. 5 is a side view of a main brake lever;

FIG. 5A is a sectional view taken along the line A—A of FIG. 5;

FIG. 6 is a perspective view illustrating the embodiment of FIG. 1 mounted on the drop-type handle of a bicycle.

DESCRIPTION OF THE PREFERRED EMBODIMENT

Figure 1:
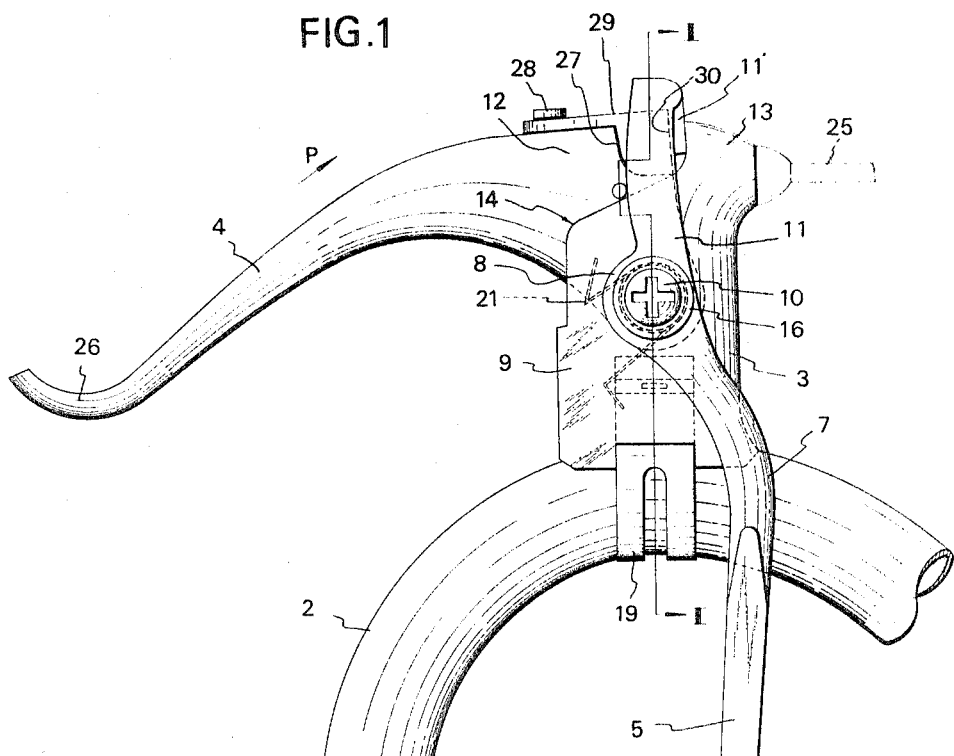
FIG. 1 is a side view of one embodiment of the present invention.
Figure 2:
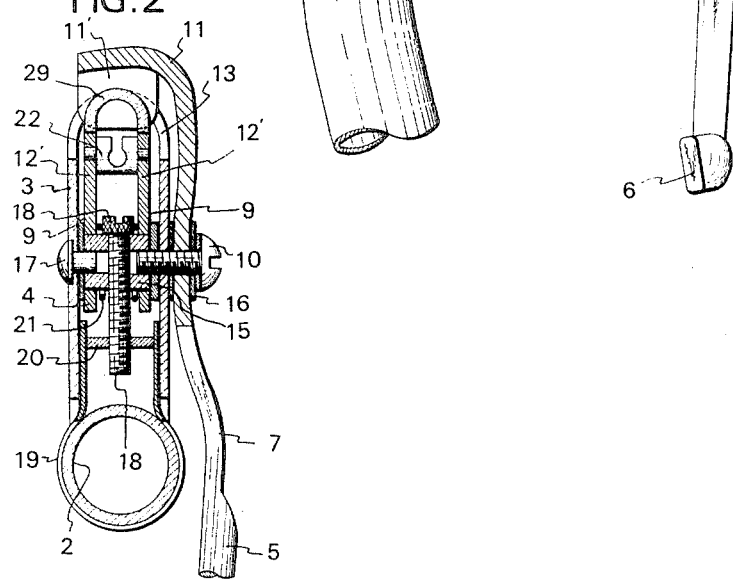
FIG. 2 is a sectional view thereof taken along the line I—I of FIG. 1.

A brake lever 4 is attached through a bracket 3 to a substantially center portion of an U-shaped bent rod section 2 of a drop handle. An auxiliary brake lever 7 having an L-shaped portion 6 extending in parallel with a straight rod section 1 of the handle is pivotably secured to the bracket 3 so that the auxiliary lever 7 may be operatively interlocked with the brake lever 4. A stepped portion 27 is formed in a head 12 at a portion thereof which abuts against a guide sleeve 13 of the bracket 3. An engaging or locking member 29 pivoted at a position adjacent to the upper end of the brake lever 4 is adapted to releasably engage with this stepped portion in such a manner that the end 30 on the engaging member 29 may also releasably engage with the guide sleeve 13.

The straight rod section 1 of the drop handle is connected with a T-shaped fork shaft 24. The head portion 8 of the auxiliary lever 7 is pivotably secured through a check shaft 10 to one sidewall 9 of the bracket 3 and an engaging or interlocking member 11 extending upwardly from the head portion 8 has its engaging or interlocking wall 11' interposed between the end 30 of engaging member 29 of the brake lever 4 and the guide sleeve 13 of the bracket 3.

The bracket 3 has generally the configuration of a box and an opening 14 formed through one portion thereof, and between the sidewalls 9 at the opening 14 is transversely extending a lever shaft 15 whose one end is fixedly secured to the check shaft 10 through a bush 16 made of nylon, synthetic resin or the like while the other end, to a stopper 37. Both of the sidewalls 12' of a head portion 12 of a brake lever 4 is rotatably carried by the lever shaft 15. A stop screw 18 extending downwardly through the lever shaft 15 at a right angle is screwed into a seat member 20 of a clip band 19 fitted over the bent rod section 2 so that the bracket 3 may be held in position.

Reference numeral 21 designates a spring while 22, a connector between the brake lever 4 and a wire for actuating a brake shoe or the like. No further detailed description of the wire for actuating the brake shoe will be made and illustrated in the accompanying drawing as it is of the conventional type and constitutes no essential part of the present invention.

Reference numeral 25 designates such the brake shoe actuating wire which imparts a force to the brake lever 4 so that it may be rotated or moved normally in the direction indicated by the arrow P in FIG. 1. Therefore, both of the head portion 12 of the brake lever 4 and the engaging wall 11' of the engaging or interlocking member 11 of the auxiliary brake lever 7 are caused to be forcibly pressed against the guide sleeve 13. So far the invention has been described with reference to the accompanying drawings illustrating only the left pair of levers 4 and 7, but it will be understood that the right brake levers having the similar construction may be attached to the right of the dropped handle.

As shown in FIG. 5, the engaging or interlocking member 29 pivotably secured by a pivot 28 to the head portion 12 of the brake lever is loaded with a spring 31 held in position by means of a nut and washer 32 and 33 so that the free rotation of the engaging or interlocking member 29 may be reliably prevented.

Next the mode of operation of the embodiment of the present invention will be described. As is the case of the normal operation of the brake lever, upon rotation in the counterclockwise direction of the brake lever 4 in FIG. 1, the brake actuating wire 25 whose one end is connected to the connector 22 is pulled through the guide sleeve 13 so that the brake shoe is caused to be firmly pressed against the rim of a front wheel, thereby applying the brake. That is, the brake may be applied by actuating the lever 4 by finger.

However, when a rider grips the straight rod section 1 of the handle or he grips the portion adjacent to the straight rod section 1 rather than the bracket 3 so that any finger of the hand gripping the handle cannot reach the brake lever 4, the auxiliary brake lever 7 may be advantageously used so as to actuate in turn the brake lever 4. That is, the auxiliary lever 7 has portions 5 and 6 extending substantially in parallel with the bent rod section 2 and the straight rod section 1 respectively so that either portion may be operated by the finger of the hand gripping the bent or straight rod section of the handle. Therefore, the lever 7 may be rotated about the check shaft 10 so that the end 30 of the engaging member 29 in engagement with the stepped portion 27 of the head 12 of the lever 4 will be engaged by the engaging wall 11' of the engaging or interlocking member 11 of the auxiliary brake lever 7, whereby the lever 4 may be rotated about the shaft 15 in the similar manner when it is actuated by its tail 26. Thus, the brake may be applied through the wire 25 for actuating the brake shoe as described above. According to the present invention, a pair of braking mechanism of the character as described hereinabove are attached to the right and left of the handle respectively, so that a rider will not be required any longer to release his hand or hands gripping the handle so as to actuate the lever or levers 4 because he cannot reach the lever or levers from his handle gripping position or positions, eliminating the dangers caused even by an instantaneous interruption of the handle steering. According to the present invention, the rider may securely and quickly actuate the brake lever or brakes from any handle gripping position or positions through the auxiliary lever or levers 7 which in turn actuate the main brake lever or levers 4, thereby ensuring the correct brake application and safe running.

According to the present invention, as described hereinabove the stepped portion 27 formed in the head 12 of the brake lever 4 which abuts against the guide sleeve 13 of the bracket 3; the engaging member 29 is pivotably secured to the brake lever 4 through the pivot 28 for releasable engagement with the stepped portion 27 while the end 30 of the engaging member 29 is also releasably engaged with the guide sleeve 13. Therefore, when the wire is connected to the brake shoe under the normal tension and in a normal length when the engaging member 29 is engaged with the stepped portion 27 as shown in FIG. 3, upon rotating or disengaging the engaging member 29 from the stepped portion 27 as shown in FIG. 4, the stepped portion 27 is caused to abut against the guide sleeve 13 through the engaging wall 11'. That is, the space which has been occupied by the engaging member 29 is occupied by the stepped portion 27 so that the brake lever 4 is rotated forwardly about the shaft 10. Therefore, the wire 25 is slacked or extended forwardly by a distance corresponding to an angle of this rotation of the brake lever 4 so that the brake shoe is spaced apart from the rim of the wheel by a distance corresponding to a length of the wire 25 extended as described above. Therefore, the wheel may be disassembled or detached from the bicycle frame in a relatively simple manner, Furthermore, the adjustment of the tension of the wire 25 may be facilitated since the wire 25 is slacked or loosened as described above. Upon reengagement of the engaging member 29 with the stepped portion 27, the brake shoe may be returned to its normal position spaced apart from the rim of the wheel by a predetermined distance.

From the foregoing, it will be clearly understood that the present invention provides an improved brake operating device in which the reliable, efficient, smooth and safe brake application can be ensured by any rider's handle gripping position or positions and the detachment or disassembly of the tires or rims of the wheels may be remarkably facilitated since the distance between the brake shoes and the rims may be enlarged only by disengaging the engaging member 29.

It will be understood that variations and modification of this invention also belong to the scope thereof.

What I claim is:

1. A brake operating device adapted to be secured to a drop-type bicycle handle having a straight crossbar and curved downwardly and forwardly facing U-shaped sections at each end thereof comprising:
   bracket means adapted to be secured on said U-shaped sections,
   main brake lever means pivotally secured to said bracket means and lying substantially in the plane of said U-shaped section, said brake lever means having a stepped portion formed at a portion thereof, flexible means secured to said main brake lever means for operating the brakes of a bicycle, an engaging member pivotably secured to said main brake lever means and adapted for movement into and out of engagement with said stepped portion, auxiliary brake lever means pivotably secured to said bracket means in interlocking engagement with said engaging member whereby the brakes on the bicycle may be effectively operated by either of said main or auxiliary brake lever means and said engaging member may be pivoted out of engagement with said stepped portion to allow additional loosening of said flexible means.

2. A brake operating device as set forth in claim 1 wherein said auxiliary brake lever means is comprised of a first section extending substantially parallel to the plane of said U-shaped section and a second section integral with said first section at a right angle thereto and extending parallel to and below said straight crossbar.

3. A brake operating device as set forth in claim 1 wherein said auxiliary brake lever means is mounted in abutting relation with said engaging member whereby said main brake lever means may be operated independently of said auxiliary brake lever means.